Nov. 11, 1958 A. C. ALLEN 2,859,622
MOMENTARY VIEWING APPARATUS
Filed May 17, 1957
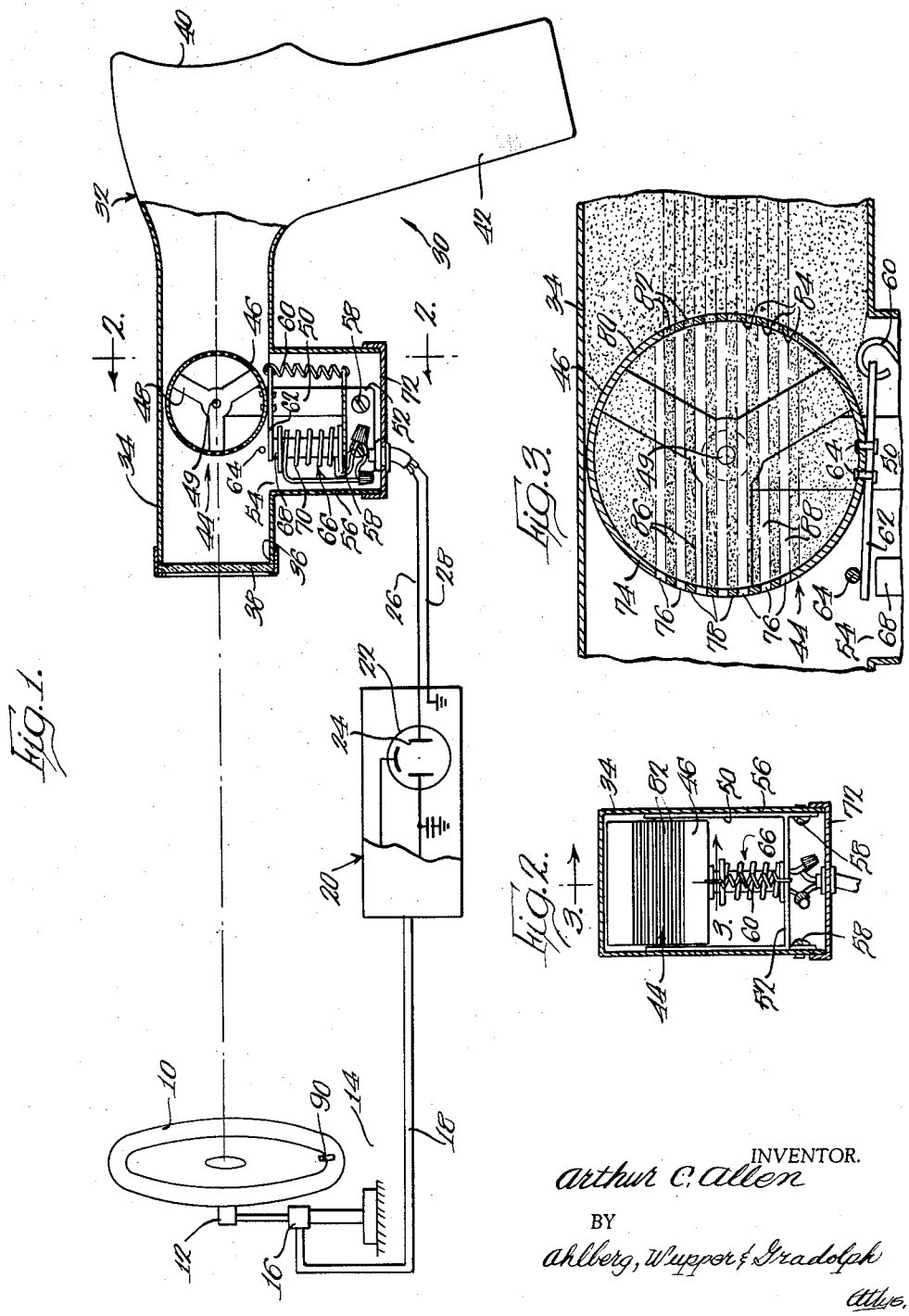
INVENTOR.
Arthur C. Allen
BY
Ahlberg, Wupper & Gradolph
Attys.

United States Patent Office 2,859,622
Patented Nov. 11, 1958

2,859,622

MOMENTARY VIEWING APPARATUS

Arthur C. Allen, Chicago, Ill., assignor to Stewart-Warner Corporation, Chicago, Ill., a corporation of Virginia Application May 17, 1957, Serial No. 659,937

5 Claims. (Cl. 73—466)

The present invention relates to devices for momentarily viewing a moving object intermittently to correlate instantaneous positions of the object with a reference system.

Apparatus of this character is used to locate unbalance in vehicle support wheels while the wheels remain mounted on coacting vehicle axle structure. The wheel to be checked for unbalance is temporarily suspended by its axle structure and rotated at a rather high speed in a manner that allows any significant unbalanced mass in the wheel to vibrate the wheel and its adjacent axle structure. The unbalance locating apparatus senses these vibrations and provides momentary views of the wheel individually synchronized with a predetermined phase of the successive vibratory cycles.

Ordinarily each momentary view of the wheel is provided by a flash of artificial light having an effective intensity on the wheel greater than the intensity of the continuous ambient light. Because of the relatively high light intensity of the flashes and the rapid succession of the flashes, the intermittent views of the wheel thus provided are perceived as a continuous dominant view of the instantaneous position of the wheel as related to its vibratory movement induced by unbalanced mass in the wheel.

While the view provided by the light flashes can be very distinct in ambient light that is somewhat subdued, it becomes less dominant and therefore less distinct in brighter light. In bright sunlight the dominance and hence the distinctiveness of the view provided by the flashing light may not be satisfactory.

One object of the invention is to provide, for use in either very bright or subdued ambient light, intermittent viewing apparatus having an improved construction which responds to vibratory movement of a rotating vehicle support wheel or the like to afford momentary views of the wheel precisely phased with its vibratory motion and having great clarity and distinctiveness even in the brightest sunlight.

A more specific object of the invention is to provide, for viewing the instantaneous position of a continuously lighted moving object, an improved viewer which normally eclipses a direct view of the object and responds substantially instantaneously to a single electrical impulse to render the normally eclipsed view momentarily visible by the continuous ambient light on the object.

Another object is to provide an intermittent viewer, as recited in the previous object, which is so constructed that the operation of the viewer to render a normally eclipsed view momentarily visible substantially instantaneously in response to a single electrical impulse is not affected by changes in the rate at which the impulses are applied to the viewer, regardless of how radical or abrupt such changes in rate may be.

A further object is to provide an intermittent viewer of the character recited which is inherently simple and durable in construction and well adapted for economical manufacture.

Other objects and advantages will become apparent from the following description of the exemplary embodiment of the invention illustrated in the drawings, in which:

Figure 1 is a partially sectioned and partially schematic side view showing apparatus embodying the invention applied to locate unbalance in a suspended vehicle support wheel;

Fig. 2 is a vertical sectional view taken along the line 2—2 of Fig. 1; and

Fig. 3 is a fragmentary sectional view on an enlarged scale taken along the line 3—3 of Fig. 2.

Designed for use in locating unbalance in a continuously lighted vehicle support wheel 10, Fig. 1, the exemplary embodiment of the invention eclipses a direct view of the wheel and responds instantaneously to movement of the wheel through an exact predetermined phase of a vibratory cycle to make the normally eclipsed view of the wheel momentarily visible by the ambient light continuously reflected from the wheel. During an unbalance determining operation, the wheel 10 is rotated at a rather high speed while mounted in a normal manner on its vehicle axle structure 12, which is temporarily elevated to suspend the wheel above the roadway 14. Means suitable for spinning the wheel 10 and means for sustaining the axle structure 12 in an elevated position in a manner which permits vibration of the axle structure by unbalanced mass in the rotating wheel are well known in the art and need not be specifically described here.

Vibratory movement of the wheel 10 is sensed by an electrical pickup 16 connected to the axle structure 12 and resting, in this instance, on the roadway 14. The construction of the pickup 16 may be similar to that shown in U. S. Patent No. 2,656,713 issued October 27, 1953, to Arthur C. Allen, or that shown in the patent application of Paul C. Hosking, Serial No. 623,650, filed November 21, 1956. In operation, the pickup 16 responds to vibratory movement of the axle structure 12 to close an electrical connection between two electrical leads 18 as the axle structure moves through the center of the path of vibratory motion sensed by the pickup.

The two leads 18 extend from the pickup 16 to electrical signal generating means 20, which is designed to discharge an electrical impulse instantaneously in response to completion of an electrical circuit through the leads 18 and the pickup 16. The desired electrical impulse is obtained by firing a strobotron 22 forming a part of the signal generating means 20. The structure of the signal generating means 20 which fires the strobotron 22 in response to operation of the pickup 16 to make an electrical connection between the leads 18 is shown in the previously mentioned Allen Patent No. 2,656,713 to which reference can be made for a detailed description. In the patent, the strobotron 10 corresponds to the strobotron 22 of the present application.

Whereas the strobotron of the Allen patent just referred to serves as a source of stroboscopic light for viewing a rotating wheel, the strobotron 22 of the signal generating apparatus 20 is fired primarily to obtain an electrical impulse, which is used to make a normally eclipsed view of the rotating wheel 10 momentarily visible by the continuous ambient light on the wheel.

The anode 24 of the strobotron 22 is grounded through two electrical leads 26, 28, which connect respectively to the anode itself and to a suitable ground connection on the signal generating structure 20. The leads 26, 28 extend to a momentary viewer 30 adapted to be held in one hand of the user.

The viewer 30 comprises body structure 32, which includes a hollow elongated barrel 34 having a forward or objective end 36 sealed against the intrusion of dust and foreign objects by a transparent cap 38. Preferably, the rear or viewing end 40 of the barrel 34 is shaped to fit comfortably around the eye of the user, where it may be conveniently supported by a pistol grip handle 42 extending laterally from the rear end of the barrel.

The objective end 38 together with the viewing end 40 of the barrel 34 define a line of sight through the barrel between the viewing end 40 and a limited field of view in front of the barrel. This line of sight is normally eclipsed by a low inertia view eclipsing element 44 disposed within the barrel 34 a considerable distance from its viewing end 40. For convenience in description the barrel 34 will be considered as being located in a generally horizontal position with the handle 42 extending downwardly from the barrel.

The view eclipsing element 44 comprises a very thin cylindrical shell 46 formed preferably from a light weight material, such as aluminum, and having a diameter and an axial length approximately equal to each other. The shell 46 is placed in the barrel 34 about two-thirds of the way from the viewing end 40 toward the objective end 38. The axis of the shell extends horizontally across the barrel 34 in generally perpendicular relation to the line of sight through the barrel. As shown in Fig. 2, the barrel 34 is squared transversely and dimensioned to closely embrace opposite ends of the shell 46 and substantially register tangentially with upper and lower cylindrical portions of the shell.

The cylindrical shell 46 is supported for pivotal movement around its own axis by a pair of webs 48 in opposite ends of the shell, which are pivotally journaled at 49 on the upper ends of two support ears 50 of a support cage 52 forming a part of the body structure 32. The cage 52 extends down through an opening 54 in the bottom of the barrel 34 and into a hollow protuberance 56 projecting downwardly from the marginal edge of the barrel opening 54. The cage 52 is secured to the protuberance 56 by screws 58.

The shell 46 is strongly biased rotatably about its pivotal axis by a tension spring 60 connected between the lower end of the cage 52 and one end of a straight actuator blade 62 extending tangentially from the lower portion of the shell to which the medial portion of the blade is securely attached. As shown, the spring 60 is connected to the end of the blade 62, which projects toward the handle 42, thus biasing the shell 46 in the clockwise direction, as viewed in Figs. 1 and 3.

The upper face of the opposite end of the blade 62 forms an abutment which engages an overlying abutment 64 on the barrel 34 to terminate spring biased pivotal movement of the shell 46 at a view eclipsing position, which has a special relationship to the shell structure as will presently appear. When engaged with the abutment 64, the actuator 62 is generally parallel to the longitudinal axis of the barrel 34, Fig. 3.

The shell 46 is rotatably snapped in the counterclockwise direction, Fig. 1, against the action of the spring 60 by a low impedance electromagnet 66, which attracts the end of the actuator blade 62 opposite from the spring. The actuator blade 62 is formed from magnetic material. As shown, the electromagnet 66 includes a magnetic core 68 attached to the lower end of the cage 52 and extending upwardly into underlying relation to the end of the actuator 62 projecting under the abutment 64. It is noteworthy that the lower end of the cage 52, which serves as a support for the electromagnet core 68 and an anchor for the spring 60, is also constructed of magnetic material. A low impedance coil 70 encircles the core 68 and is connected at opposite ends to the signal generator leads 26, 28, which extend upwardly through a cap 72 on the lower end of the protuberance 56.

The upper end of the electromagnetic core 68 and the underside of the adjacent end of the actuator 62 respectively constitute a pair of abutments which engage to terminate electromagnetic, counterclockwise rotation of the shell 46 in a viewing position displaced rotatably only a very small angle from the previously mentioned view eclipsing position of the shell.

The cylindrical half-section 74 of the shell 46 nearer the objective end 36 of the barrel 34 is apertured by a circumferential series of narrow longitudinal slots 76 parallel to the axis of the shell, Figs. 2 and 3. The series of slots 76 is bounded by unsevered portions of the shell 46, which include a series of opaque bars 78 intervening between and separating the slots.

The cylindrical half-section 80 of the shell 46 nearer the viewing end 40 of the barrel 34 is apertured to form a circumferential series of narrow slots 82 separated by an intervening series of opaque bars 84, all substantially parallel to the axis of the shell 46.

The series of slots 76 and bars 78 in the forward or objective portion of the shell 46 and the series of slots 82 and bars 84 in the rear or viewing portion of the shell are oriented and dimensioned in relation to each other so that the rearwardly extending shadows 86 of the forward bars 78 and adjacent unsevered structure of the forward portion 74 of the shell completely fill and block the view through the opposing slots 82 at the rear, when the shell 46 is in its normal view eclipsing position shown in Fig. 3. Put another way, the unsevered structure (including the bars 84) of the rear portion 80 of the shell 46 block the shafts of light 88 extending rearwardly from the forward slots 76, when the shell is in its view eclipsing position.

Thus movement of the shell 46 into its view eclipsing position, Fig. 3, brings each of the slots 76, 82 into registry, transverse to the line of sight through the barrel, with an opposing opaque portion of the shell. The width of the bars 78, 84 is at least equal to that of the respective opposing slots 84, 76.

The magnetic rotation of the shell 46 to the viewing position previously mentioned is just sufficient to bring the forward slots 76 and the rearward slots 82 into registry with respect to the line of sight through the barrel 34. This permits the shafts of light 88 to continue from the forward slots 76 on through the rearward slots 82, thus making the normally eclipsed view momentarily visible.

The moving parts of the viewer 30 are limited to the pivotal eclipsing element 44 and the connected end of the spring 60. The eclipsing element 44 is normally at rest in its view eclipsing position. Because of the low rotational inertia of the eclipsing element 44, the very small angle between its eclipsing position and its viewing position, the low impedance of the electromagnet 66, and a relatively high capacity of the electromagnet 66 to apply torque to the eclipsing element, the viewer 30, in effect, snaps the eclipsing element 44 into viewing position instantly in response to a single magnetic impulse supplied from the generating means 20 through the leads 26, 28. The spring 60 is equally effective in shaping the eclipsing element 44 back to its stationary, view eclipsing position, where the kinetic energy and momentum gained by the element in making the normally eclipsed view momentarily visible is instantly dissipated.

Since the eclipsing element 44 is at rest both at the beginning and at the end of each operating cycle, it follows that the response of the viewer 30 to the individual electrical impulses supplied from the signal generator 20 is not affected by the changes in the rate at which the impulses follow each other, with the possible exception of control pulse rates which are close to the natural vibrating frequency of the view eclipsing structure.

However, this possible exception is of no practical significance, since the rate at which control pulses are supplied in response to vibrations of a vehicle support wheel 10 during an unbalance determining operation are far outside the resonant frequency of the eclipsing structure.

The location of unbalance in the wheel 10 is determined in a conventional manner from the observed position of an indicator 90 on the wheel as revealed by the momentary views provided by the viewer 30.

Since the wheel 10 is viewed by the continuous ambient light on the wheel, it follows that increases in intensity of this ambient light improve rather than detract from the distinctiveness and clarity of the momentary views provided through the viewer 30. Hence, the apparatus is especially well suited for use in bright sunlight.

While I have shown a preferred embodiment of my invention, it will be apparent that numerous variations and modifications thereof may be made without departing from the underlying principles and scope of the invention. I therefore desire, by the following claims, to include all such variations and modifications by which substantially the results of my invention may be obtained through the use of substantially the same or equivalent means.

I claim:

1. For normally eclipsing light continuously reflected from a view of limited scope and making the view momentarily visible only once in response to a single electrical impulse, a momentary viewer comprising, in combination, body means including a hollow barrel having an objective end and a viewing end defining a line of sight through the barrel, a first wall element extending transversely across the interior of said barrel a substantial distance from the viewing end thereof, a second wall element extending transversely across the interior of said barrel between said first wall element and the viewing end of the barrel, a magnetic actuator on one of said wall elements, a spring interconnected between said body means and said one wall element to move the latter with respect to the other wall element in transverse relation to said line of sight to a view eclipsing position, an electromagnet mounted on said body means adjacent said magnetic actuator to attract the latter against the action of said spring to move said one wall element to a viewing position displaced with respect to said other wall element transversely in relation to said line of sight, each of said wall elements being formed to define therein a pattern of apertures similar to the pattern of apertures in the other wall element and to define between the apertures opaque structure having dimensions transverse to said line of sight which are larger than similar dimensions of corresponding apertures in the other wall element, said apertures being dimensioned and located in the respective wall elements to effect when said one wall element is in said viewing position a registration transverse to said line of sight of the apertures in each wall element with the apertures in the other wall element, and the spacing between apertures in each wall element being at least equal to the displacement of said one wall element relative to the other wall element in moving between said view eclipsing position and said viewing position.

2. For normally eclipsing light reflected from a continuously lighted view of limited scope and making the view momentarily visible only once in response to a single electrical impulse, a momentary viewer comprising, in combination, body means including an elongated barrel having an objective end and a viewing end defining a line of sight through the barrel, a view eclipsing element including a thin cylindrical shell extending transversely across the interior of said barrel a substantial distance from the viewing end thereof, means on said body means supporting said eclipsing element for pivotal movement about the axis of said shell, a magnetic actuator integral with said shell and forming a part of said view eclipsing element, a spring connected between said body means and said eclipsing element to yieldably pivot the latter in one direction about said axis of pivotal movement, said body means and said eclipsing element respectively defining an opposing pair of abutment surfaces for terminating pivotal movement of said eclipsing element in said first direction in a predetermined view eclipsing position, an electromagnet on said body means positioned adjacent said magnetic actuator to magnetically attract the latter in a direction to pivot said eclipsing element against said spring to a viewing position displaced a small angle from said view eclipsing position thereof, said shell including two portions thereof facing respectively toward the viewing end and the objective end of said barrel, each of said shell portions being formed to define a series of slots generally parallel to the pivotal axis of said eclipsing element and an intervening series of opaque bars separating the slots and having a width at least equal to that of corresponding slots in the other shell portion, and said slots being dimensioned and located on said shell to effect when said eclipsing element is in said viewing position a registration transverse to said line of sight of the series of slots in one of said shell portions with the series of slots in the other shell portion and to effect when said eclipsing element is in said eclipsing position a registration transverse to said line of sight of slots in one of said shell portions with bars in the other shell portion.

3. For normally eclipsing light reflected from a continuously lighted view of limited scope and making the view momentarily visible only once in response to a single electrical impulse, a momentary viewer comprising, in combination, body means including an elongated barrel having an objective end and a viewing end defining a line of sight through the barrel, a view eclipsing element including a thin view eclipsing shell traversing the interior of said barrel a substantial distance from the viewing end thereof, pivot means supporting said shell on said body means for pivotal movement about an axis generally perpendicular to said line of sight, said view eclipsing element including as a portion thereof a small mass of magnetic material spaced from said axis and constituting a magnetic actuator integral with said shell, a spring connected between said body means and said eclipsing element to yieldably pivot the latter rotatably in a first direction about said axis, said body means including an electromagnet positioned adjacent said magnetic actuator to attract the latter in a direction which pivots said eclipsing element about said axis in a second direction opposite said first direction, said body means and said eclipsing element respectively defining a first pair of opposing abutments positioned to terminate pivotal movement of said eclipsing element in said first direction in a predetermined view eclipsing position, said body means and said eclipsing element respectively defining a second pair of opposing abutments positioned to terminate pivotal movement of said eclipsing element in said second direction in a viewing position displaced rotatably from said eclipsing position by only a very small angle, said shell including two wall portions spaced from each other along said line of sight and traversing the interior of said barrel, each of said wall portions being apertured to define a series of slots generally parallel to said shell axis and separated by an intervening series of opaque bars having a width at least equal to that of corresponding slots in the other wall portion, and said slots being dimensioned and located in said shell to effect when said eclipsing element is in said viewing position a registration transverse to said line of sight of the series of slots in one of said wall portions with the series of slots in the other wall portion and to effect when said eclipsing element is in said eclipsing position a registration transverse to said line of sight of slots with bars in the opposing wall portion of said shell.

4. Apparatus for locating unbalance in rotating vehicle support wheels or the like, comprising, in combination, an electrical pickup sensitive to mechanical vibrations, an electrical impulse generator connected to said pickup to produce electrical impulses in response to vibratory actuation of said pickup, an electromagnet connected to said impulse generator for momentary energization by electrical impulses produced by said generator, a hollow barrel having a viewing end and an objective end; a pivotal view eclipsing element including a thin, view eclipsing shell traversing the interior of said barrel; means supporting said shell for pivotal movement about an axis generally perpendicular to the longitudinal axis of said barrel, said view eclipsing element including as a portion thereof a small mass of magnetic material spaced from the pivotal axis of said shell and constituting a magnetic actuator integral with the shell, a spring connected to said eclipsing element to yieldably pivot the latter rotatably in a first direction about said pivotal axis thereof, abutment means connected with said barrel and coacting with said eclipsing element to terminate pivotal movement of the latter in said first direction in a predetermined view eclipsing position, said electromagnet having a position adjacent said magnetic actuator to attract the latter to pivot said eclipsing element against said spring to a viewing position displaced a small angle from said eclipsing position, said shell including two barrel traversing portions spaced from each other along the longitudinal axis of said barrel, each of said shell portions being formed to define a circumferential series of apertures separated by intact shell structure, and said apertures on both shell portions being dimensioned and located on the shell to effect when said eclipsing element is in said viewing position a registration transverse to the longitudinal axis of said barrel of the apertures in one of said shell portions with the apertures in the other shell portion and to effect when said eclipsing element is in said eclipsing position a registration transverse to said longitudinal barrel axis of the apertures in one of said shell portions with the intact shell structure of the other shell portion, each of said apertures being somewhat smaller than corresponding intact shell structure of the opposing shell portion.

5. Apparatus for locating unbalance, in rotating vehicle support wheels or the like, comprising, in combination, body means including a hollow barrel having an objective end and a viewing end defining a line of sight through the barrel, a first masking element extending transversely across the interior of said barrel a substantial distance from said viewing end thereof, a second masking element extending transversely across the interior of said barrel between said first masking element and said viewing end of the barrel, a magnetic actuator on one of said masking elements, a spring interconnected between said body means and said one masking element to move the latter relative to the other masking element in a direction transverse to said line of sight to a normal view eclipsing position, an electromagnet mounted on said body means adjacent said actuator to attract the latter against the action of said spring to move said one masking element relative to the other masking element to a viewing position displaced from said eclipsing position transversely with respect to said line of sight, each of said masking elements being formed to define therein a pattern of transparent areas similar to the pattern of transparent areas defined in the other masking element and to define between the transparent areas in the masking element opaque structure having dimensions transverse to said line of sight which are at least equal to similar dimensions of adjacent transparent areas in the other masking element, an electrical impulse generator connected to said electromagnet to supply electrical impulses thereto, and an electrical pickup connected to said impulse generator to trigger operation of the latter to momentarily energize said electromagnet.

References Cited in the file of this patent
UNITED STATES PATENTS

| | | |
|---|---|---|
| 1,566,124 | Rogers | Dec. 15, 1925 |
| 1,582,622 | Ashdown | Apr. 27, 1926 |
| 1,609,233 | Whidbourne et al. | Nov. 3, 1926 |
| 1,746,179 | Ashdown | Feb. 4, 1930 |
| 2,690,075 | Kryeske | Sept. 28, 1954 |
| 2,712,232 | Pfeiffer | July 5, 1955 |
| 2,721,474 | Phelps | Oct. 25, 1955 |